H. C. & S. W. LIGGETT & G. M. HOOD.
SAFETY GAS VALVE.
APPLICATION FILED MAR. 18, 1918.
1,294,359.
Patented Feb. 11, 1919.
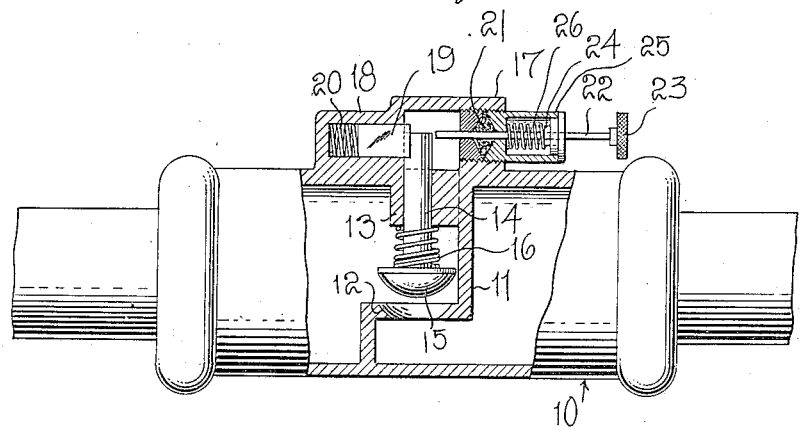
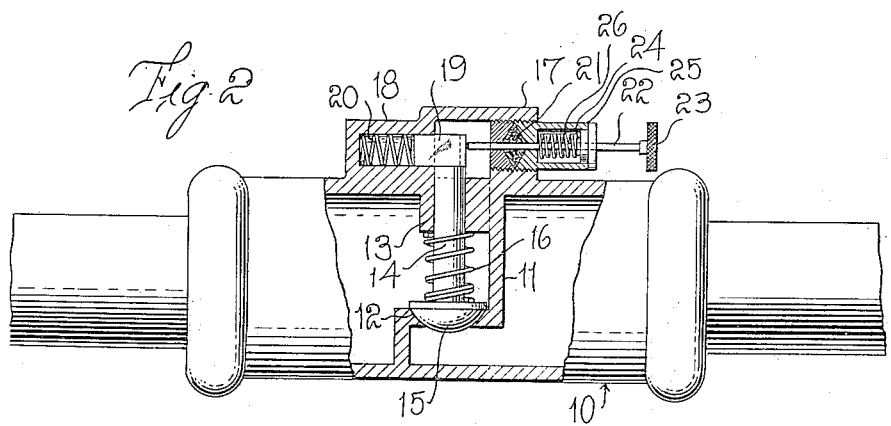
Inventors
Hugh C. Liggett
Sherman W. Liggett
George M. Hood
By Watson E. Coleman
Attorney

UNITED STATES PATENT OFFICE.

HUGH C. LIGGETT, SHERMAN W. LIGGETT, AND GEORGE M. HOOD, OF SALINEVILLE, OHIO.

SAFETY GAS-VALVE.

1,294,359.      Specification of Letters Patent.      Patented Feb. 11, 1919.

Application filed March 18, 1918. Serial No. 223,202.

*To all whom it may concern:*

Be it known that we, HUGH C. LIGGETT, SHERMAN W. LIGGETT, and GEORGE M. HOOD, citizens of the United States, residing at Salineville, in the county of Columbiana and State of Ohio, have invented certain new and useful Improvements in Safety Gas-Valves, of which the following is a specification, reference being had to the accompanying drawings.

This invention relates to gas controlling valves, and particularly to a gas controlling valve which will close when the gas pressure is reduced beyond a certain point, to thus prevent the gas escaping into a room after gas pressure has been again increased.

Many deaths have occurred from this cause. The gas pressure in the house mains is reduced and lights which are turned low accordingly go out. Then when the gas pressure is increased, this gas escapes from the burners. Our invention is intended to obviate this difficulty by providing a valve which will close automatically upon a decrease of pressure and which will be held closed until the valve is manually released, a further object being to provide a valve of this character which will not open, however, when the latch is manually released unless there is a predetermined pressure of gas within the main.

Our invention is illustrated in the accompanying drawings, wherein:—

Figure 1 is an elevation partly in section of our improved valve, the valve proper being open; and Fig. 2 is a like view to Fig. 1, but showing the valve closed.

Referring to these drawings, 10 designates the valve casing generally which is so formed as to be connected in a pipe line. Extending across the valve casing is a transverse septum 11 formed with a valve seat 12, which extends approximately parallel to the length of the valve casing. Above the valve seat 12, the valve casing is formed to provide an annular barrel 13 within which reciprocates the stem 14 of a valve 15, which coacts with the seat 12. Surrounding the stem 14 is a coiled spring 16, which urges the valve 15 and the stem downward so that the valve closes the aperture through the valve seat.

Disposed on the casing 10 and forming part thereof is a housing 17 into which the valve stem 14 may project when the valve is raised from its seat and from this housing is a lateral extension 18 in which is disposed a sliding bolt or latch 19 urged toward the valve stem by means of a spring 20. This bolt or latch 19 has a rounded end face fitting the side face of the stem 14.

One end of the casing 17 is provided with a stuffing box or packing gland 21 and through this gland passes a slidable rod or pin 22 having a head 23 and a collar 24. This rod or pin passes through an extension or cap 25 within which is disposed a coiled spring 26 which bears against the collar 24 and urges the pin 22 outward.

The operation of our safety valve is as follows: Under normal circumstances, the gas pressure within the main and within the valve casing 10 will hold the valve 15 and the stem 14 raised, and the stem will be engaged by the bolt or plunger 19 urged against the stem by the spring 20. This spring 20 is sufficiently strong so as to hold the valve stem raised against the pressure of the spring 16 when there is gas pressure upon the under face of the valve 15, that is, when there is gas pressure within the casing 10. If now the gas pressure is reduced beyond a predetermined point, the spring 16 becomes effective, the valve is urged to its seat, and the bolt 19 is shot across the upper end of the valve stem 14 locking the valve in its seated position and preventing the valve from raising. Under these circumstances, the flow of gas through the main is cut off and even though the gas pressure increases, the valve 15 cannot lift from its seat.

If it be again desired to permit gas to pass through the casing 10, the pin or rod 22 is forced inward. This pin is of sufficient length so that it will bear against the bolt 19 and when pressed fully inward will force the bolt 19 back into the housing 18 beyond the top of the valve stem 14 and, under these circumstances, the pressure of gas within the casing, if there is gas pressure beyond a predetermined amount, will raise the valve 15 and then upon a release of the pin 22, the bolt 19 will again engage with the valve stem 14 holding the valve raised. If there is no pressure or a pressure below a predetermined amount in the gas main of the valve casing, when the plunger or bolt 19 is retracted, the valve will not rise.

It will be seen that this construction provides a safety lock for a gas valve which will absolutely prevent the possibility of the valve remaining open after the gas pressure has become reduced beyond a predetermined amount, and which will prevent the valve from again opening upon an increase of gas pressure until its release has been manually effected. While we have illustrated the particular form of this invention, it is obvious that many changes might be made in the details of construction and in the arrangement of parts without departing from the spirit of the invention and that it may be used in other situations than that described where it is necessary to provide for the automatic closing of the valve upon a decrease of pressure in the pipe line.

Having described our invention, what we claim is:—

1. A device of the character described comprising a valve casing having a valve seat therein, a valve coacting with the seat and having a valve stem, a spring urging the valve to a closed position on the seat, a housing attached to the valve casing over the end of the stem and open at one end, a sliding locking bolt mounted in the housing opposite the open end of the housing and moving transversely to the movement of the stem and toward the open end of the housing, a spring urging the bolt to a position across the end of the stem, a stuffing box removably disposed in the open end of the housing opposite the bolt, a pin passing through said stuffing box and when forced inward engaging with the bolt and causing its retraction, and a spring yieldingly urging the pin outward.

2. A device of the character described comprising a valve casing having a valve seat therein, a valve coacting with the seat and having a valve stem, a spring urging the valve to a closed position on the seat, a housing attached to the valve casing over the end of the stem and open at one end, a sliding locking bolt mounted in the housing and moving transversely to the movement of the stem, a spring urging the bolt to a position across the end of the stem and toward the open end of the housing, a stuffing box removably disposed in the open end of the housing opposite the bolt, a pin passing through said stuffing box and when forced inward engaging with the bolt and causing its retraction, a spring yieldingly urging the pin outward, and a cap through which the pin passes inclosing said spring.

In testimony whereof we hereunto affix our signatures in the presence of two witnesses.

HUGH C. LIGGETT.
SHERMAN W. LIGGETT.
GEORGE M. HOOD.

Witnesses:
JETTA McCORMICK,
S. E. McCORMICK.